(12) United States Patent
Bruss (10) Patent No.: US 7,796,579 B2
(45) Date of Patent: Sep. 14, 2010

(54) TECHNIQUE FOR INTERCONNECTING INTERMEDIATE NETWORK NODES

(75) Inventor: Jorg Bruss, Eschweiler (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 309 days.

(21) Appl. No.: 11/720,504

(22) PCT Filed: Dec. 3, 2004

(86) PCT No.: PCT/EP2004/013775

§ 371 (c)(1),
(2), (4) Date: May 30, 2007

(87) PCT Pub. No.: WO2006/058554

PCT Pub. Date: Jun. 8, 2006

(65) Prior Publication Data

US 2008/0095167 A1    Apr. 24, 2008

(51) Int. Cl.
*H04L 12/28* (2006.01)
(52) U.S. Cl. ...................... 370/351; 370/394
(58) Field of Classification Search .............. 370/394, 370/351, 352
See application file for complete search history.

(56) References Cited

U.S. PATENT DOCUMENTS

| 6,694,471 | B1* | 2/2004 | Sharp | 714/749 |
|---|---|---|---|---|
| 6,735,634 | B1* | 5/2004 | Geagan et al. | 709/235 |
| 7,006,433 | B1* | 2/2006 | Dantu et al. | 370/218 |
| 7,046,658 | B1* | 5/2006 | Kundaje et al. | 370/352 |
| 2001/0053145 | A1* | 12/2001 | Willars et al. | 370/352 |
| 2002/0075900 | A1* | 6/2002 | Turina et al. | 370/467 |
| 2003/0193696 | A1* | 10/2003 | Walker et al. | 358/402 |
| 2004/0049612 | A1* | 3/2004 | Boyd et al. | 710/52 |
| 2005/0157726 | A1* | 7/2005 | Vesterinen | 370/395.5 |
| 2007/0153801 | A1* | 7/2007 | Sung et al. | 370/395.4 |

FOREIGN PATENT DOCUMENTS

WO    WO 03/094477 A    11/2003

OTHER PUBLICATIONS

Sidebottom et al., Signaling System 7 (SS7) Message Transfer Part 3 (MTP3) User Adaptation Layer (M3UA), Sep. 2002, Network Working Group, RFC 3332.*
Stewart et al., Stream Control Transmission Protocol, Oct. 2000, Network Working Group, RFC 2960.*

(Continued)

*Primary Examiner*—Dang T Ton
*Assistant Examiner*—Robert M Morlan (57) ABSTRACT

A technique is provided for relaying data packets by an intermediate network node, the data packets being transported via a protocol, such as SCTP, in which an association containing one or more streams transporting sequenced data packets is established between two network components. The technique receives, by a transport layer, packets with individual sequence Numbers from a plurality of inbound streams. These packets are forwarded by the transport layer to a user layer without sorting. Thereafter, the user layer selects an outbound stream for each of the packets, and the packets, each of which having a sequence number that preserves the packet order determined by its original sequence number, are sent to the transport layer for transmission via the selected outbound streams.

12 Claims, 6 Drawing Sheets

OTHER PUBLICATIONS

Stewart R et al: "RFC 2960: Stream Control Transmission Protocol" ETSI Standards, Oct. 31, 2000, XP002220549.

"Services and Protocols for Advanced Networks (SPAN); MTP/SCCP/SSCOP and SIGTRAN (Transport of SS7 over IP); Stream Control Transmission Protocol (SCTP) 'Endorsement of RFC 2960 and RFC 3309, modified! ; ETSI TS 102 144" ETSI Standards, Sophia-Antipo, FR, vol. SPAN-13, No. V111 May 2003, XP014006921 ISSN: 0000-0001.

* cited by examiner

TECHNIQUE FOR INTERCONNECTING INTERMEDIATE NETWORK NODES

FIELD OF THE INVENTION

The invention relates to communications. More specifically, the invention relates to a technique for efficiently forwarding data packets and for interconnecting intermediate network nodes such as signalling relay nodes.

BACKGROUND AND SUMMARY OF THE INVENTION

Intermediate network nodes are arranged between two endpoints and handle traffic (at least) on a transport layer. Such intermediate network nodes, for example relay nodes, are expected to be adopted to perform traversing of traffic over incoming and outgoing connections of protocols in which there are several data streams exchanging sequenced messages within a connection (also referred to as an association), such as Stream Control Transmission Protocol (SCTP). Examples of relay nodes that will likely become adopted or have been adopted include Message Transfer Part Level 3 User Adaption Layer (M3UA) relays, Session Initiation Protocol (SIP) proxies, H.323, or Diameter proxies.

The M3UA protocol is a protocol defined by the SIGTRAN working group in IETF. M3UA supports the transport of any SS7 MTP-3 User Signalling (e.g., ISDN User Part (ISUP) and Signalling Connection Control Part (SCCP) messages) over IP using the services of SCTP. In addition, provision is made for protocol elements that enable a seamless operation of the MTP3-User peers in the SS7 and IP domains. This protocol would likely be used between a Signalling Gateway (SG), on one hand, and a Media Gateway Controller (MGC) or IP-resident Database, on the other hand, or between two IP-based applications. For purposes herein, it is assumed that the SG receives SS7 signalling over a standard SS7 interface using the SS7 Message Transfer Part (MTP) to provide transport.

It is likely that new intermediate network nodes will be adopted pursuant to M3UA which are referred to herein as M3UA relays. An M3UA relay takes the role of an intermediate node, forwarding packets based on the address information transported in the M3UA layer. This address information is, in the simplest case, the signalling point code (SPC) of the destination. Therefore, an M3UA relay resembles most of the functionality associated with an MTP3 intermediate node (also referred to as a signalling transfer point (STP)).

The following describes the operation of the proposed M3UA relays as provided in the Requests for Comments (RFCs) describing SCTP and M3UA as well as other SIGTRAN related specifications.

Figure 1:
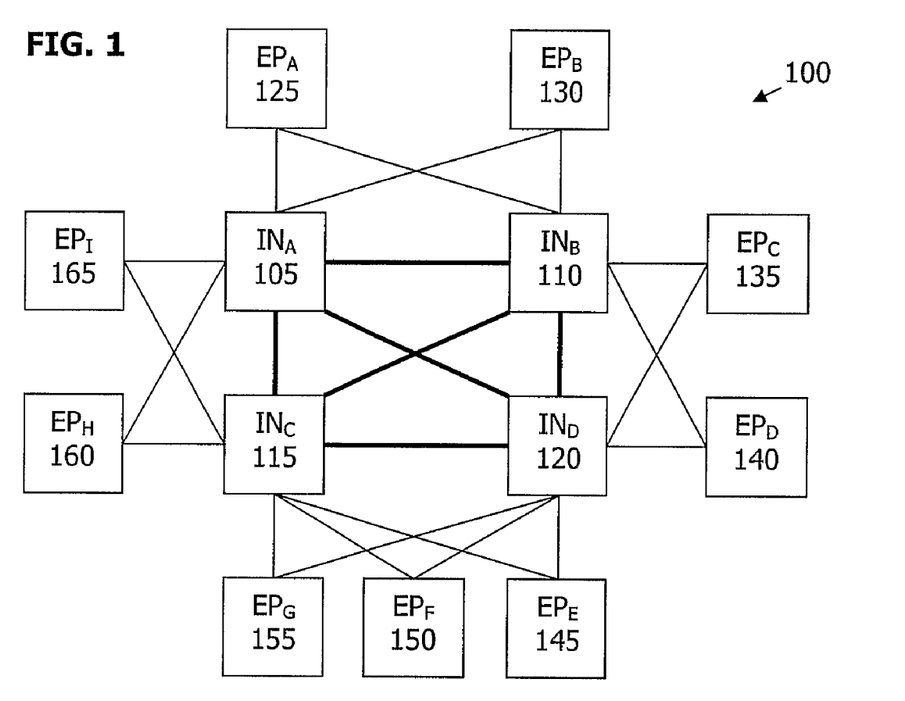
FIG. 1 is a system architecture diagram useful for understanding and implementing the invention illustrating the function of an intermediate network node that is also useful for understanding and implementing the invention.

With reference to FIG. 1, an architecture diagram 100 that may be used in connection with the current invention is illustrated. The diagram 100 shows an M3UA network that utilizes M3UA relays with a typical STP-like topology having redundancy for intermediate nodes and the links between the nodes in order to avoid a single point of failure.

In the diagram 100, there are four M3UA relay nodes 105, 110, 115, 120 that represent the interconnecting core in a M3UA network and nine endpoints (EPs) (e.g., signalling end points, SEPs) 125-165, each with a different signalling point code (SPC). SCTP associations that carry the M3UA packets interconnect the M3UA relay nodes 105, 110, 115, 120. The topology of the M3UA relay sub-network is that of a clique graph in which each M3UA relay node is connected to any other M3UA relay node in the network by an SCTP association, as represented by a thick line indicating a higher traffic level, because those SCTP associations aggregate the traffic of all of the end systems.

The signalling endpoints 125-165 are typically each connected to two M3UA relays 105, 110, 115, 120 for redundancy purposes. As those associations only carry traffic to and from that particular SEP, thin lines indicate the lower traffic volume on those associations.

SCTP, as well as other similar protocols which perform packet sorting, support sequenced delivery of user messages within multiple streams, with an option to disable this feature in exchange for order-of-arrival delivery (unordered delivery) of individual user messages. SCTP uses streams for sequenced delivery. An association can support several inbound and outbound streams. Each stream has a stream number that is indicated in the SCTP packet. Each packet belonging to a stream gets a sequence number that is valid in the context of the stream. The sequence number is consecutively allocated in the order the packets are sent on that stream. Sorting of packets is done at the receiving end for each stream according to the sequence number prior to delivering the packet to the SCTP user. Packet loss in any one stream does not affect data delivery within other streams (i.e., head-of-line blocking is avoided between streams).

If M3UA relays are to be adopted in connection with a data transport protocol such as SCTP, then there may be several sub-optimal performance characteristics. An M3UA relay node would likely include several SCTP associations that interconnect the M3UA relay nodes among each other and connect to M3UA SEPs with a single SCTP association being used between each pair of M3UA relay nodes. The SCTP associations work in the default mode in which packet order is preserved (ordered delivery) because M3UA users rely on ordered delivery of messages. Therefore, the SCTP instances at the M3UA relay nodes necessarily decompose incoming packets by queuing and sorting them and later aggregating the packets so that M3UA users receive is the packets in the same order as originally sent by the source.

Figure 2:
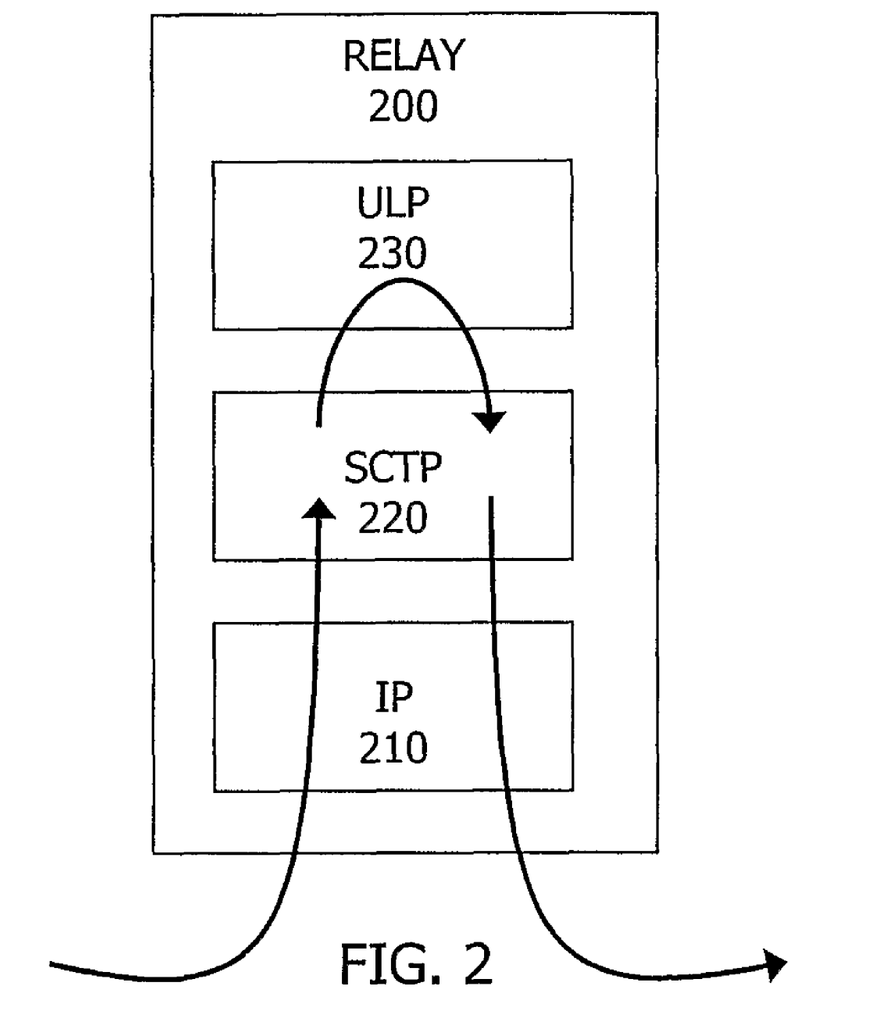
FIG. 2 is a schematic diagram of an intermediate network node useful for understanding and implementing the invention.

In FIG. 2, a relay node 200 is illustrated that may be used in connection with the current invention. The relay node includes an SCTP instance 220 that receives packets from an IP layer 210. The SCTP instance 220 receives the incoming packets and sorts them before providing them to an M3UA unit 230, which subsequently returns the sorted packets to the SCTP instance 220 for ultimate delivery via the IP layer 210. However, as the relay node 200 is merely relaying the ordered packets back to another network node, there is no need for the SCTP instance 220 to sort the packets, and thus unnecessary processing capabilities are consumed—which impairs the overall network latency and maximum throughput (i.e., congestion occurs more often).

Moreover, packet traffic from SCTP associations connecting SEPs to M3UA relays will have to be treated in a certain manner rather than just as signalling links in a traditional signalling network. In addition, although and M3UA relay nodes will likely use policies similar to MTP networks in which only one packet path is used at a time, problems may exist with receiving packets from multiple paths, such as link failure, node failure, or the like, which may result in packets on the fly on the previous path simultaneously when new packets are using a new path.

It will be appreciated that there remains a need for an intermediate network node that relays data packets in an efficient and rapid manner.

SUMMARY

The above-mentioned needs are satisfied by a method for relaying data packets by an intermediate network node. With this method, data packets are transported via a protocol in which an association containing one, two or more streams transporting data packets with sequence numbers (also called "sequenced packets" hereinafter) is established between two network components, such as network terminals or network nodes. A transport layer receives packets having individual sequence numbers from a plurality of inbound streams. Thereafter, each of the packets is forwarded by the transport layer to a user layer without sorting. The user layer next selects an outbound stream for each of the packets and sends the packets for being relayed via the selected outbound streams, wherein each of the relayed packets has a sequence number that preserves the packet order determined by its original sequence number.

In order to preserve the original packet order, the packets sent by the user layer to the transport layer for relaying via the selected outbound streams may simply maintain their original sequence number (i.e., the relayed packets may have the same sequence number as received from the inbound streams). However, the packet order will also be preserved if the sequence number of each relayed packet is increased or decreased by a constant number or multiplied with a constant factor. Of course, there are several other approaches for preserving the original packet order without the necessity to maintain the original packet sequence number.

The forwarding step may also forward parameters associated with each of the packets including at least one of an inbound stream identifier, a source identifier, and a destination identifier. On or more of these parameters may subsequently be utilized by the selecting step when a determination is made regarding the selection of the outbound stream. In addition or in the alternative, the forwarding step may also forward, for each packet, a signaling code of the destination (e.g., an SPC), and this signaling code may be used in connection with the selection of the outbound stream. The intermediate network node may support the transfer of user signaling and also the transfer and receipt of the data packets over Internet Protocol (IP).

The method may further comprise the steps of receiving, by an endpoint, at least a portion of the packets, and sorting, by the endpoint, the received packets based on sequence number. With this variation, the packets delivered to the endpoint are unordered. In an alternative variation, the method may include the steps of receiving, by a second intermediate node adjacent to an endpoint, at least a portion of the packets, sorting, by the second intermediate node, the received packets based on sequence number, and sending, by the second intermediate node, the sorted sequenced packets to the endpoint.

The method may provide that each inbound stream has one outbound stream associated therewith. This association may occur based on predetermined criteria in the selecting step or the association may be manually designated. In furtherance thereof, the method may comprise the additional step of generating an entry within a look-up table for each packet received for each new combination of source and destination, the entry associating an outbound stream for the new combination of a source and a destination. This look-up table can then be used during the selecting step for subsequently received packets having the same source and destination combination.

The method may be used in connection with data transport protocols such as Stream Control Transmission Protocol. In these configurations, the transport layer may be a Stream Control Transmission Protocol layer. The intermediate network node may also be an M3UA relay. Other variations of intermediate network nodes may include session initiation protocol proxies, H.323 protocol proxies, or Diameter protocol proxies (although all of such proxies may not be fully compatible with SCTP as the data transport protocol).

A sorting indication may be utilized that is encoded within or associated with each packet that disables a sorting feature of the transport layer so that packets are delivered in an unordered fashion. The sorting indication may be set, changed and/or removed by the source or any intermediate network node. In some variations, the method may further comprise the step of removing the sorting indication within or associated with each packet prior to delivery (e.g., to the destination).

In yet another variation, the method may also include the step of interposing, between the transport layer and the user layer, a sorting layer that sorts each of the packets within a particular source/destination combination based on sequence number prior to receipt of the packets by the user layer.

In another embodiment, a computer program product is provided comprising program code portions for performing the steps of one of the claims provided herein when the computer program product is run on one or more computers or computer systems. Optionally, the computer program code may be stored on a computer readable medium.

The invention may also be embodied in a system comprising a computer processor and a memory coupled to the processor, wherein the memory is encoded with one or more programs that may perform steps for relaying information received by an intermediate network node according to one of the methods provided herein.

In still another embodiment of the invention, an apparatus to relay data packets received by an intermediate network node is provided. With this apparatus, the data packets being transported via a protocol in which an association containing one or more streams transporting sequenced data packets is established between two network components. The apparatus includes a transport protocol layer unit to receive packets having individual sequence numbers from a plurality of inbound streams and to relay each of the packets unsorted via an outbound stream, each of the relayed packets having a sequence number that preserves the packet order determined by its original sequence number, and a user layer protocol unit to select the outbound stream for each of the packets received by the transport protocol layer unit.

The packets may each having a sorting indication that the packet is not to be sorted. The packets may be forwarded unsorted to the user layer protocol unit along with parameters including at least a destination identifier. The user layer protocol unit may to select the outbound stream for each of the packets based on the parameters.

Similarly, the invention may also be embodied in a system having a plurality of apparatuses, such as the one previously described, and further comprising a plurality of endpoints each of which being coupled to at least two of the apparatuses to provide redundant signaling paths. The endpoints may by coupled to the apparatuses (and the apparatuses may be coupled to each other) via Stream Control Transmission Protocol associations in a concatenated fashion to enable a virtual stream between two endpoints.

BRIEF DESCRIPTION OF THE DRAWINGS

In the following the invention will be described with reference to exemplary embodiments illustrated in the figures, in which.

DETAILED DESCRIPTION OF PREFERRED EMBODIMENTS

In the following description, for purposes of explanation and not limitation, specific details are set forth, such as particular signal formats, etc. in order to provide a thorough understanding of the current invention. It will be apparent to one skilled in the art that the current invention may be practiced in other embodiments that depart from these specific details. For example, the skilled artisan will appreciate that the current invention may be utilized in connection with other signalling protocols other than SCTP. Moreover, those skilled in the art will also appreciate that the functions explained herein below may be implemented using individual hardware circuitry, using software functioning in conjunction with a programmed microprocessor or general purpose computer, using an application specific integrated circuit (ASIC), and/or using one or more digital signal processors (DSPs). It will also be appreciated that while the current invention is primarily described as a method, it may also be embodied in a system comprising a computer processor and a memory coupled to the processor, wherein the memory is encoded with one or more programs that may perform the methods disclosed herein.

Figure 3:
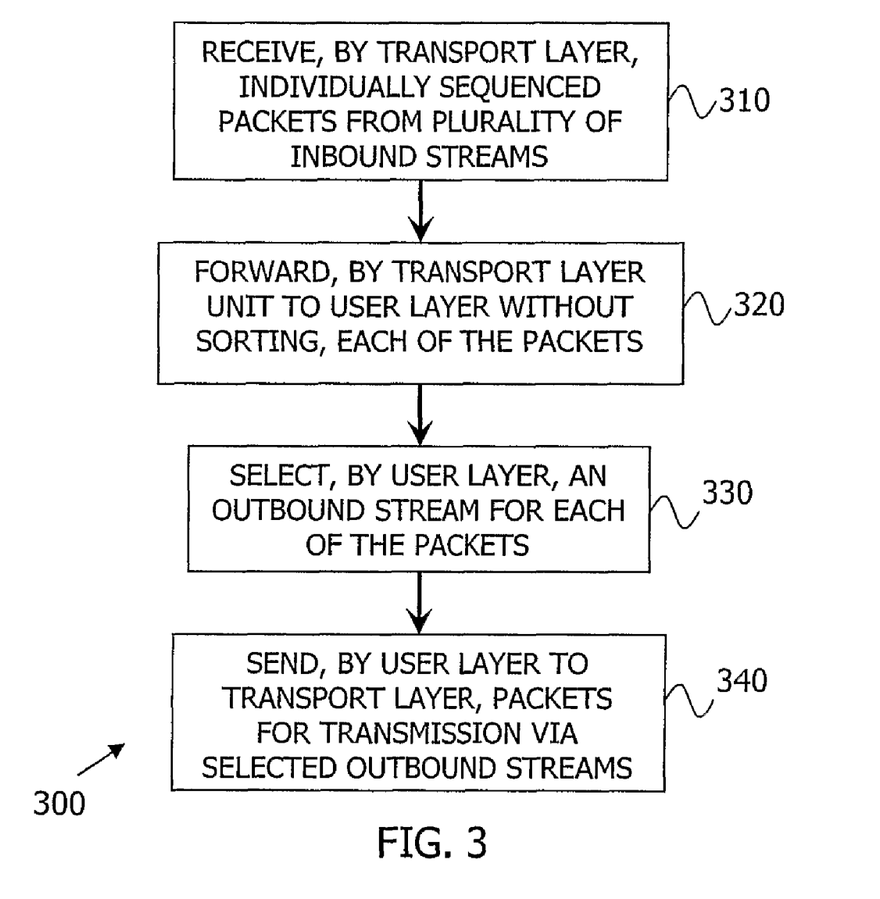
FIG. 3 is a process flow diagram according to a method embodiment of the invention.

With reference to FIG. 3, a method 300 is illustrated for relaying data packets by an intermediate network node, the data packets being transported via a protocol in which an association containing one or more streams transporting data packets having sequence numbers is established between two network components (e.g., SCTP). At step 310, individually sequenced packets from a plurality of inbound streams are received by a transport layer. Thereafter, at step 320, the transport layer forwards each of the packets to a user layer without sorting. The user layer, at step 330, selects an outbound stream for each of the packets and, at step 340, sends the packets to the transport layer for transmission (relay) via the selected outbound streams, each of the packets on the outbound streams having the same sequence number as on the inbound streams. Alternatively, the relayed packets may have obtained new sequence numbers that are chosen such that the original packet order (e.g., as defined by the sending endpoint) is maintained. To this end, the intermediate network node may multiply the original sequence numbers with a constant factor ("spreading") or perform any other suitable operation.

The following provides examples of variations that may be optionally used in connection with the embodiments described herein, either alone or in combination where applicable. While the following may describe the intermediate network node as being an M3UA relay and the data transport protocol as being SCTP, it will be appreciated that other types of protocols may be used. For example, other data protocols may be utilized that ensure each packet from a particular source to a particular destination is assigned a proper sequence number to allow the destination EP to perform packet sorting (i.e., there has to be a stream of sequence-stamped packets for each source/destination communication relation in the network) and that individual streams from one point to another can be aggregated on a fixed association between the two points.

In order to obtain the desired configuration, streams on individual SCTP associations are concatenated along the path traversing the M3UA network between the two EPs that have a communication relation. The concatenation is done in such a way that a virtual stream is created end-to-end for each communication relation between any two nodes that have a communication relation. With this approach, stream based sorting algorithms as provided by SCTP may continue to be used at the destination EP (and, in most instances, only at the destination).

Figure 4:
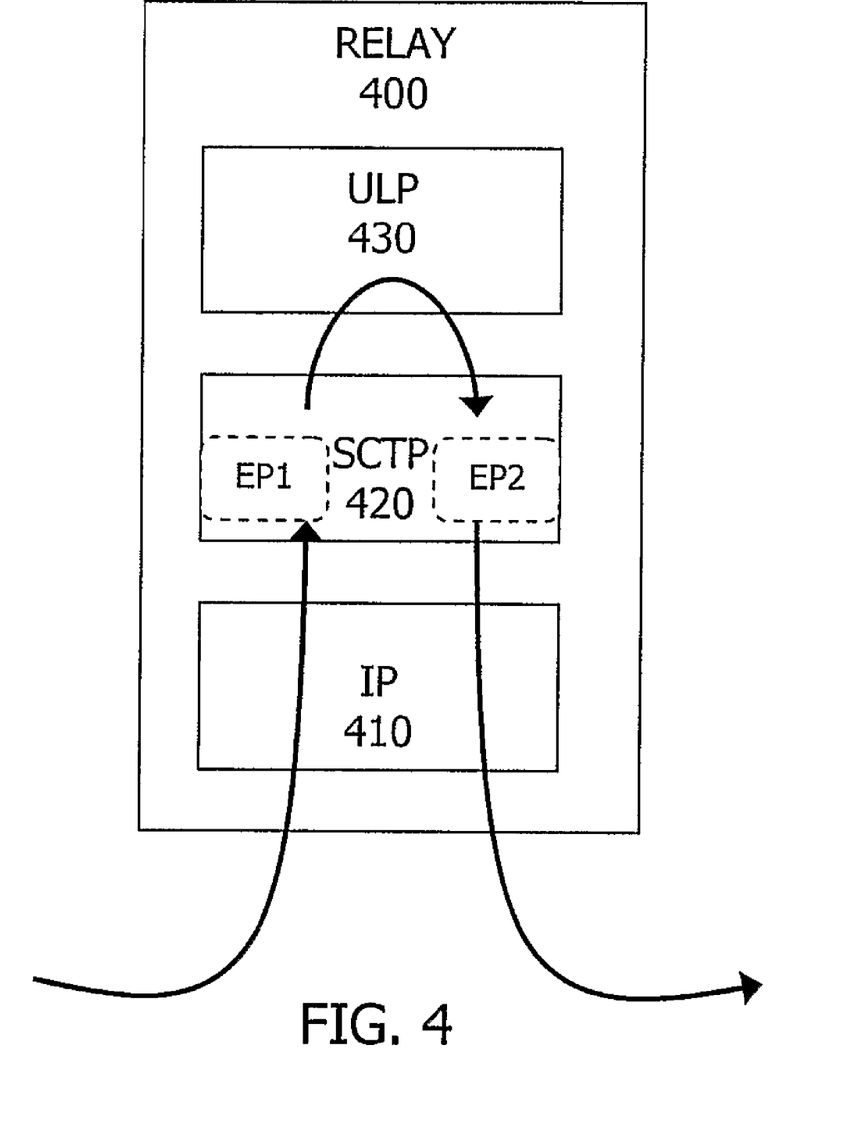
FIG. 4 is a schematic diagram according to an apparatus embodiment of the invention.

With reference to FIG. 4, an example of a intermediate network node 400 is provided that is useful for understanding and implementing the invention. An SCTP instance 420 receives packets via the IP layer 410. The SCTP instance 420 that is handling an association $IA_n$ must be notified that an incoming packet is not to be sorted (in order to distinguish from traffic destined to a local user—such as an adjacent endpoint node, that requires sorting). Various options may be utilized to notify the SCTP instance 420 that a packet is to be relayed rather than sorted (the "relaying indicator").

The SCTP instance 420 will immediate forward packets with the relaying indicator to a ULP 430. Optionally, and in the case of M3UA, each packet will also be forwarded with an association identifier (identifying the association from which the packet was received), a stream identifier $IS_m$ (identifying the stream from which the packet was received), and the stream sequence number SN (identifying the sequence number assigned to the packet for the particular stream). Such information might be encapsulated within a RECEIVE primitive or similar message/signal.

The ULP 430, which may optionally be M3UA, will select the outgoing association according to the configured routing tables based on the destination address (DPC for M3UA). The selection of the outbound stream is done for the combination of source and destination address (OPC/DCP combination) as this combination includes the stream of packets for which there exists a set of sequenced packets.

When an outbound stream is selected, the ULP 430 will send the packets, indicating as accompanying parameters, the association identifier, the stream identifier $OS_m$, and the stream sequence number SN (which should be identical to the sequence number received on the inbound stream). Optionally, a SEND primitive might be modified to include sequence number or other message/signal be utilized to send this information.

In a first variation for determining whether a relaying indicator is present, the sending SCTP entity sets an explicit indication for the outgoing packet. The relay indicator may, for example, be encoded as a special bit in the reserved field in the $2^{nd}$ byte of the SCTP DATA chunk (between the Type field and the U bit). Each sending SCTP entity does this, starting from the first entity at the source node until the last intermediate network node. This indication initiates the relaying (versus sorting) behaviour of the intermediate network node as described above. An endpoint will treat this indication in the same way a normal SCTP packet is sorted in a queue. Optionally, the last intermediate network node may remove the relaying indicator in order to ensure that the receiving endpoint properly processes the packet (e.g., sorts the packet). The intermediate network node can remove this relaying indicator based on the routing table on the ULP as the destination node will be adjacent to the intermediate network node. This variant allows unordered, ordered, and relayed traffic to co-exist in the network and to be properly distinguished by each SCTP instance.

In a second variation for determining whether a relaying indicator is present, an explicit relaying indication within each packet is avoided in an effort to minimize any negative impact on SCTP. However, because these relaying indicators are not pre-sent within the packets, unordered, ordered, and relayed traffic cannot co-exist. With this second variant, the sending endpoint uses the unordered delivery feature of SCTP when the adjacent node is not the final destination but an intermediate network node. As the sequence numbers are maintained for the packets, the last intermediate network node will only use the ordered delivery feature of SCTP when the adjacent node is the final destination node. The destination node will then sort the incoming packets as defined for SCTP without any modification. As an alternative, and in an effort to distinguish between both types of unordered delivery, one might assign different types of data traffic to dedicated streams such that certain streams solely use ordered delivery whereas the other streams use the hybrid approach of the second variation.

Three variations may also be utilized in stream concatenation. With the first stream concatenation variation, a network operator manually defines that a particular inbound stream on association is tied to an outbound stream on another association. Such an arrangement may be of particular use when there is little need to periodically change these stream concatenation settings.

In a second stream concatenation variation, when an association is established, and the intermediate network node receives the first packet for a particular stream, the intermediate network node will examine the source and destination addresses as provided in the packet portion belonging to the ULP. For example, for an M3UA relay, there will be an OPC and DPC embedded in the M3UA DATA chunk carried in the SCTP packet.

The intermediate network node will look up its internal routing table on the ULP level (e.g., the Signalling Point Code (SPC) based routing entries in the case of M3UA) and determine the outgoing association and will select a unique, yet unallocated outbound stream on that association. Furthermore, it will create an entry in a look-up table in the form:

$(IA_n, IS_m) \rightarrow (OA_o, OS_p)$

With $IA_n$ being the inbound association n, $IS_m$ being the inbound stream m on association n, $OA_o$ being the outbound association o, and $OS_p$ being the outbound stream p on association o.

Thereafter, the concatenation of these two streams is fixed (unless network error conditions require a change) and the outbound stream in the outgoing association can be quickly determined by checking the look-up table for any incoming packet on this stream in the association. The intermediate network node need not examine the source and destination addresses for the ULP for any subsequently received packets. In comparison with the first arrangement, the differences are analogous to those of Multi Protocol Label Switching (MPLS) routing as compared to IP routing.

As for the third stream concatenation variation, it solely relies on configuration of objects belonging on the SCTP layer. The configuration determines or establishes the look-up table already mentioned in context with the second variation.

Figure 5:
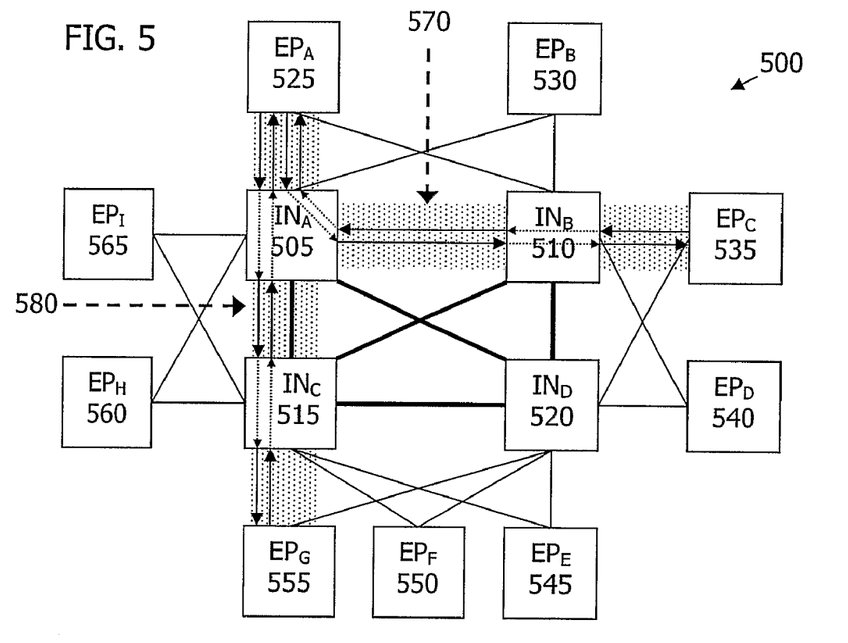
FIG. 5 is a system architecture diagram useful for understanding and implementing the invention.

FIG. 5 illustrates an architecture diagram 500 in which intermediate network nodes 505, 510, 515, 520 relay packets to and from a plurality of EPs 525-565. With focus on the communication relations between $EP_A$ 525 and $EP_G$ 555, on the one hand, and between $EP_A$ 525 and $EP_C$ 535, on the other hand, there are shown thick grey lines between the nodes representing virtual streams 570, 580. Within the virtual streams 570, 580 there are also illustrated sample inbound and outbound streams. Also illustrated within the intermediate network nodes 505, 510, 515 are dashed line arrows representing concatenation of the data streams which are used to form the end-to-end virtual streams 570, 580. Other streams, whether virtual or otherwise, are not shown although they may exist for other communications relations.

With the arrangement of FIG. 5, when a packet is assigned a sequence number at the source node, the sequence number is maintained throughout the path to the destination node as if this stream would be directly wired via the associated virtual stream. The destination node will thereafter perform packet sorting for all individual inbound streams on the connection association (as it typically performed with regard to SCTP). This configuration utilizes packet sorting at the final destination while traversing any unnecessary intermediate packet sorting or queuing.

The above arrangement is best suited for a data transport protocol such as SCTP that only offers a limited number of inbound and outbound streams per association thereby resulting in an upper limit of end-to-end streams that are possible for a certain network using an intermediate node, such as an M3UA relay. One each association there must be a sufficient number of streams available to accommodate the number of end-to-end communications relations that are handled over that stream such that there will be a unique virtual stream in the network for each particular end-to-end communication relation.

As an example, if the communications relations could be represented by a clique graph in which each node can communication with any other node, then there could only be up to 362 nodes as there could be a maximum of 65,535 streams (separately for inbound and outbound streams) per association (taking into account that for a clique graph with n nodes $n*(n-1)/2$ connections are required). In order to avoid this problem, several associations may be utilized when the aggregation of traffic will require more than 65,535 streams.

The variations described above operate without sequencing errors when there are no redundant paths in the network. If, for example, a primary path is used according to the routing tables in the nodes and such primary path malfunctions, then a particular node will detect this error condition and inject the applicable packet traffic on an alternative path. As there are potentially older packets on the fly on the previous path that may reach the destination, unaffected by the error condition, there may be two (or more) streams reaching the final destination (this is because the sequencing mechanism of SCTP works only in the context of a single stream within an association). Moreover, as mis-sequencing in the network may have occurred prior to reaching the point of error, the streams may be incomplete and therefore delivery to the ULP at the final destination will cease. The following addresses such problems.

For intermediate network nodes and sending endpoints, it is important that the allocation scheme of sequence number is maintained after selecting an alternative outgoing association. Such maintenance ensures that at least the sequence number is correct for all packets that belong to a certain flow of packets (i.e., for a source/destination combination). For the receiving component, packet sorting must be turned off at the SCTP level as packets may be missing on one stream, but are received on another stream. Otherwise, head-of-line blocking would likely occur.

Figure 6:
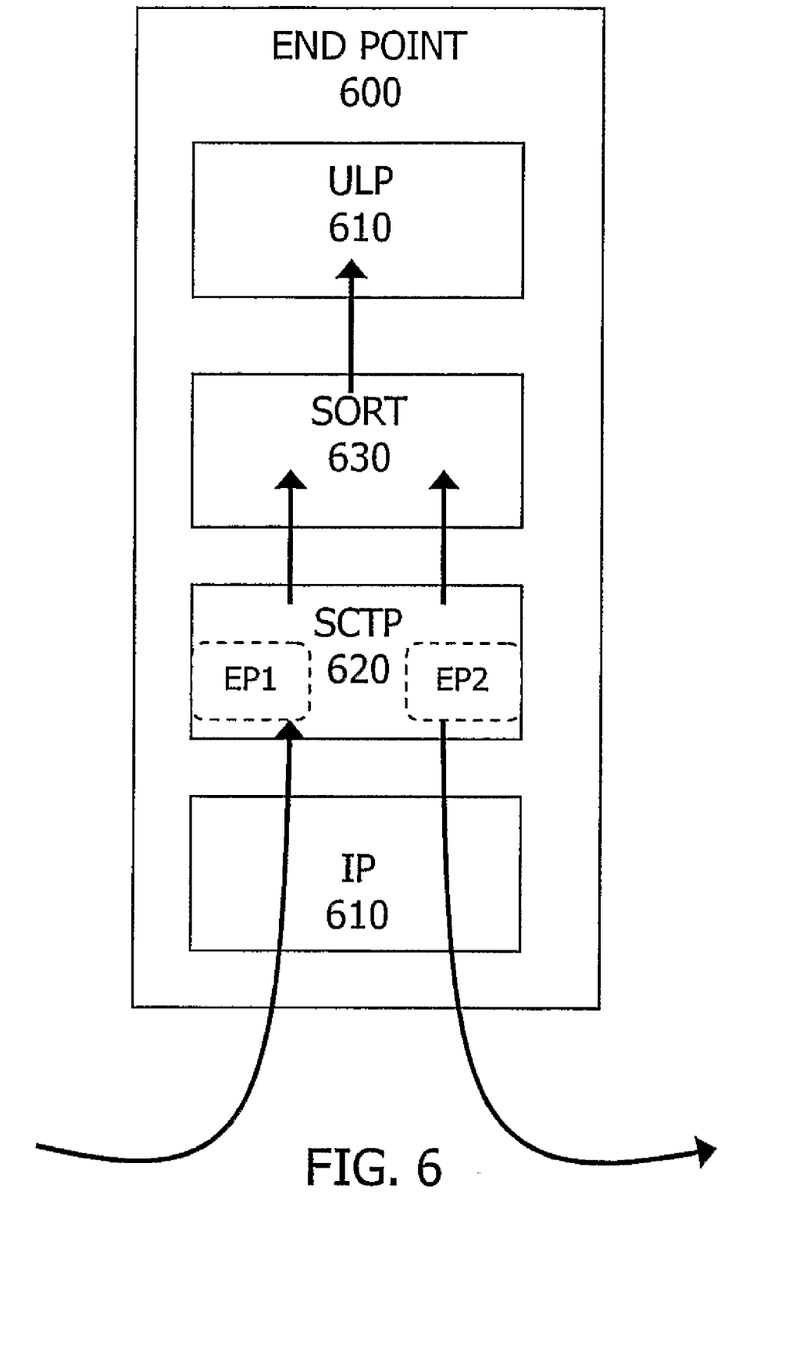
FIG. 6 is a schematic diagram of an example useful for understanding and implementing the invention in which a sorting layer is employed.

Consequently, the packet sorting must be performed above the SCTP layer, but below the ULP. With reference to FIG. 6, an end point 600 is illustrated in which packets are received by an SCTP instance 620 via an IP layer 610 which are then sorted by a sorting layer 630 and then provided to ULP 640. In this arrangement, packet sorting is performed above the SCTP instance 620 but below the ULP 640. The sorting layer (or layer) 630 is a local intermediate layer that is not a protocol layer (i.e., no protocol data units are exchanged over the wire).

The sorting algorithm in the sorting layer 630 sorts the packets so that all packets with the same source/destination address combination (e.g., OPC and DPC for the case of a simple M3UA implementation) will be sorted according to the sequence number carried along with the packet. The sorting layer 630 receives all of the traffic associated with the ULP 640 (e.g., traffic dedicated to M3UA) from an incoming association and from any stream. The sorting layer 630 checks the source/destination address combination and injects the packet into a dedicated in-queue, relying on the fact that any previous node along the path maintained the proper sequence number for each packet. As there will be many communication partners for the receiving endpoint, there will also be numerous in-queues associated therewith.

The skilled artisan will recognize that there are many advantages to the current invention relating to the traversal of traffic over incoming and outgoing streams within an association. The techniques described herein avoid many of the inefficiencies of the other relaying methodologies by avoiding unnecessary packet sorting thereby reducing processing requirements while also decreasing the transit time for packets passing through intermediate network nodes.

While the current invention has been described with respect to particular embodiments (including certain system arrangements and certain orders of steps within various methods), those skilled in the art will recognize that the current invention is not limited to the specific embodiments described and illustrated herein. Therefore, while the current invention has been described in relation to its preferred embodiments, it is to be understood that this disclosure is only illustrative. Accordingly, it is intended intended that the invention be limited only by the scope of the claims appended hereto.

The invention claimed is:

1. A method for relaying data packets by an intermediate network node, the data packets being transported via a Stream Control Transmission Protocol, SCTP, in which an association containing one or more streams transporting data packets with sequence numbers is established between two network components, the method comprising the steps of:
   receiving, at a first SCTP endpoint in a SCTP unit, the data packets with individual sequence numbers from a plurality of inbound streams;
   forwarding, by the first SCTP endpoint to a user layer without sorting, each of the data packets;
   selecting, by the user layer, an outbound stream for each of the data packets; and
   sending, by the user layer to a second SCTP endpoint in the SCTP unit, the data packets for relaying via the selected outbound streams, each of the relayed data packets having a sequence number that preserves the data packet order determined by its original sequence number; and
   sending the relayed data packets to a destination endpoint, where the destination endpoint has a sorting layer interposed between a SCTP Unit and a user layer, where the sorting layer sorts each of the relayed data packets within a particular source and destination combination based on sequence number prior to receipt of the relayed data packets by the user layer.

2. The method of claim 1, wherein the forwarding step also forwards parameters associated with each of the data packets including at least one of an inbound stream identifier, a source identifier, and a destination identifier, and wherein the selecting step selects the outbound stream based on the parameters.

3. The method of claim 1, wherein the forwarding step also forwards, for each data packet, a signaling code of a destination.

4. The method of claim 1, further comprising the steps of:
   receiving, by a second intermediate node adjacent to a destination endpoint, at least a portion of the data packets;
   sorting, by the second intermediate node, the received data packets based on the sequence number; and
   sending, by the second intermediate node, the sorted data packets to the destination endpoint.

5. The method of claim 1, wherein each inbound stream has one outbound stream associated therewith.

6. The method of claim 5, wherein the association of each inbound stream to the one outbound stream associated therewith is manually designated.

7. The method of claim 1, further comprising the step of generating an entry within a look-up table for each data packet received having a new combination of destination and source, the entry associating an outbound stream for the new combination of a source and a destination.

8. The method of claim 1, wherein the intermediate network node relay is an M3UA relay.

9. The method of claim 1, wherein the intermediate network node relay is chosen from a group comprising: session initiation protocol proxies, H.323 protocol proxies, or Diameter protocol proxies.

10. The method of claim 1, wherein a sorting indication is encoded within or associated with each data packet, the sorting indication disabling a sorting feature of the Stream Control Transmission Protocol Layer Unit.

11. The method of claim 10, further comprising the step of:
   removing the sorting indication within, or associated with, each data packet prior to delivery.

12. A system having an apparatus for relaying data packets received by an intermediate network node, the data packets being transported via a Stream Control Transmission Protocol, SCTP, in which an association containing one or more streams transporting data packets with sequence numbers is established between two network components, the apparatus comprising:
   a SCTP unit including a first SCTP endpoint and a second SCTP endpoint; and a user layer protocol unit, where the first SCTP endpoint receives data packets with individual sequence numbers from a plurality of inbound streams and forwards without sorting each of the data packets to the user layer protocol unit that selects an outbound stream for each of the data packets and sends the second SCTP endpoint the data packets for relaying via the selected outbound streams, each of the relayed data packets having a sequence number that preserves the data packet order determined by its original sequence number;

and further comprising a source endpoint and a destination endpoint, wherein the source endpoint and the destination endpoint are coupled with each other via the apparatus wherein the destination endpoint receives the relayed data packets and comprises a sorting layer interposed between a SCTP unit and a user layer, where the sorting layer sorts each of the relayed data packets within a particular source/destination combination based on sequence number prior to receipt of the relayed data packets by the user layer.

* * * * *

UNITED STATES PATENT AND TRADEMARK OFFICE
CERTIFICATE OF CORRECTION

| | | |
|---|---|---|
| PATENT NO. | : 7,796,579 B2 | Page 1 of 1 |
| APPLICATION NO. | : 11/720504 | |
| DATED | : September 14, 2010 | |
| INVENTOR(S) | : Bruss | |

It is certified that error appears in the above-identified patent and that said Letters Patent is hereby corrected as shown below:

In Fig. 6, Sheet 6 of 6, below "ULP", delete "610" and insert -- 640 --, therefor.

In Column 2, Line 41, after "receive" delete "is".

In Column 7, Line 18, delete "pre-sent" and insert -- present --, therefor.

Signed and Sealed this
Twenty-second Day of February, 2011

David J. Kappos
*Director of the United States Patent and Trademark Office*